July 31, 1945. J. E. HECKETHORN 2,380,841
THREADING AND TESTING MACHINE
Filed April 17, 1944 2 Sheets-Sheet 1
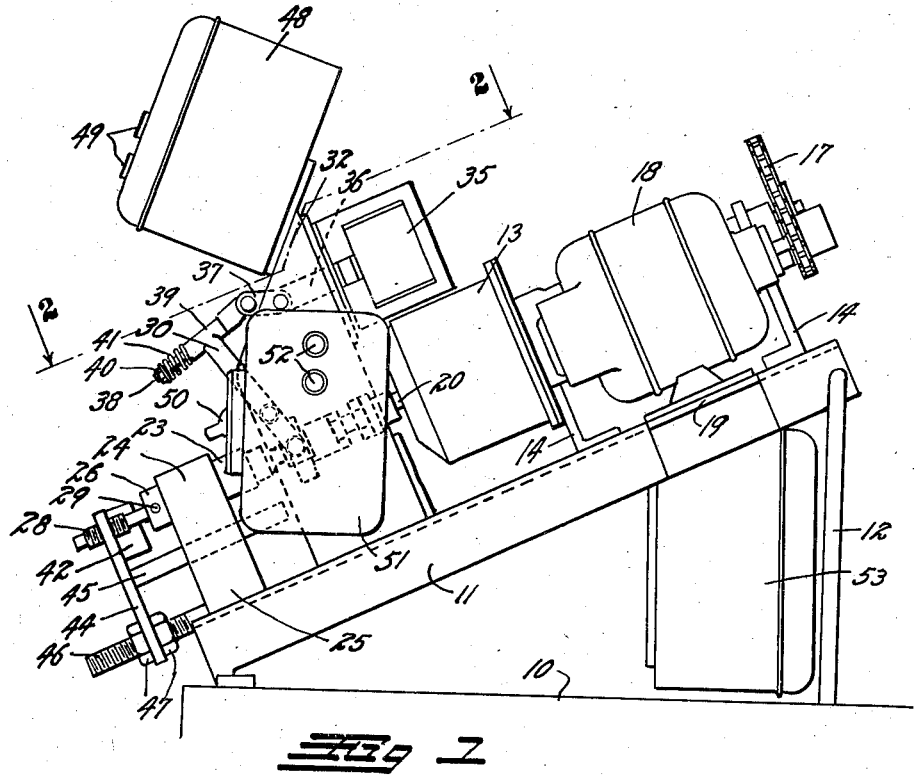
Fig. 1
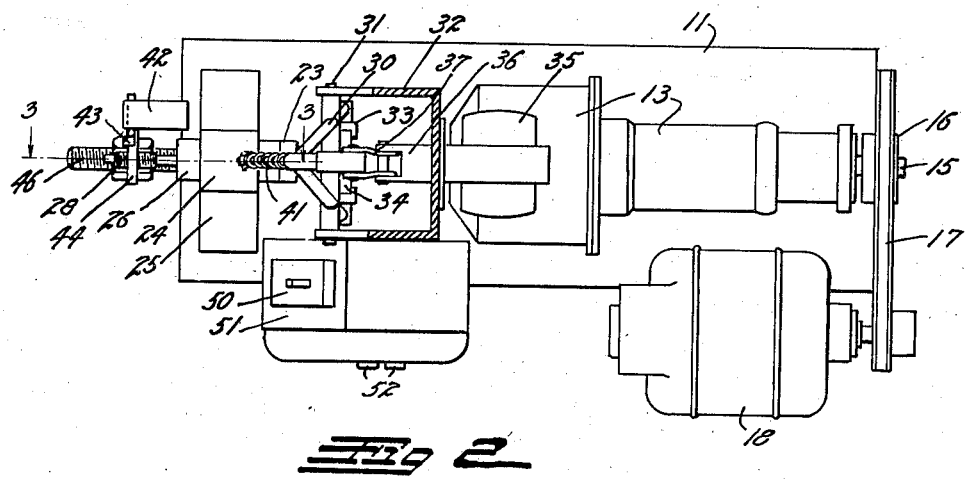
Fig. 2
INVENTOR.
JOHN E. HECKETHORN
BY
ATTY.

July 31, 1945. J. E. HECKETHORN 2,380,841
THREADING AND TESTING MACHINE
Filed April 17, 1944 2 Sheets-Sheet 2
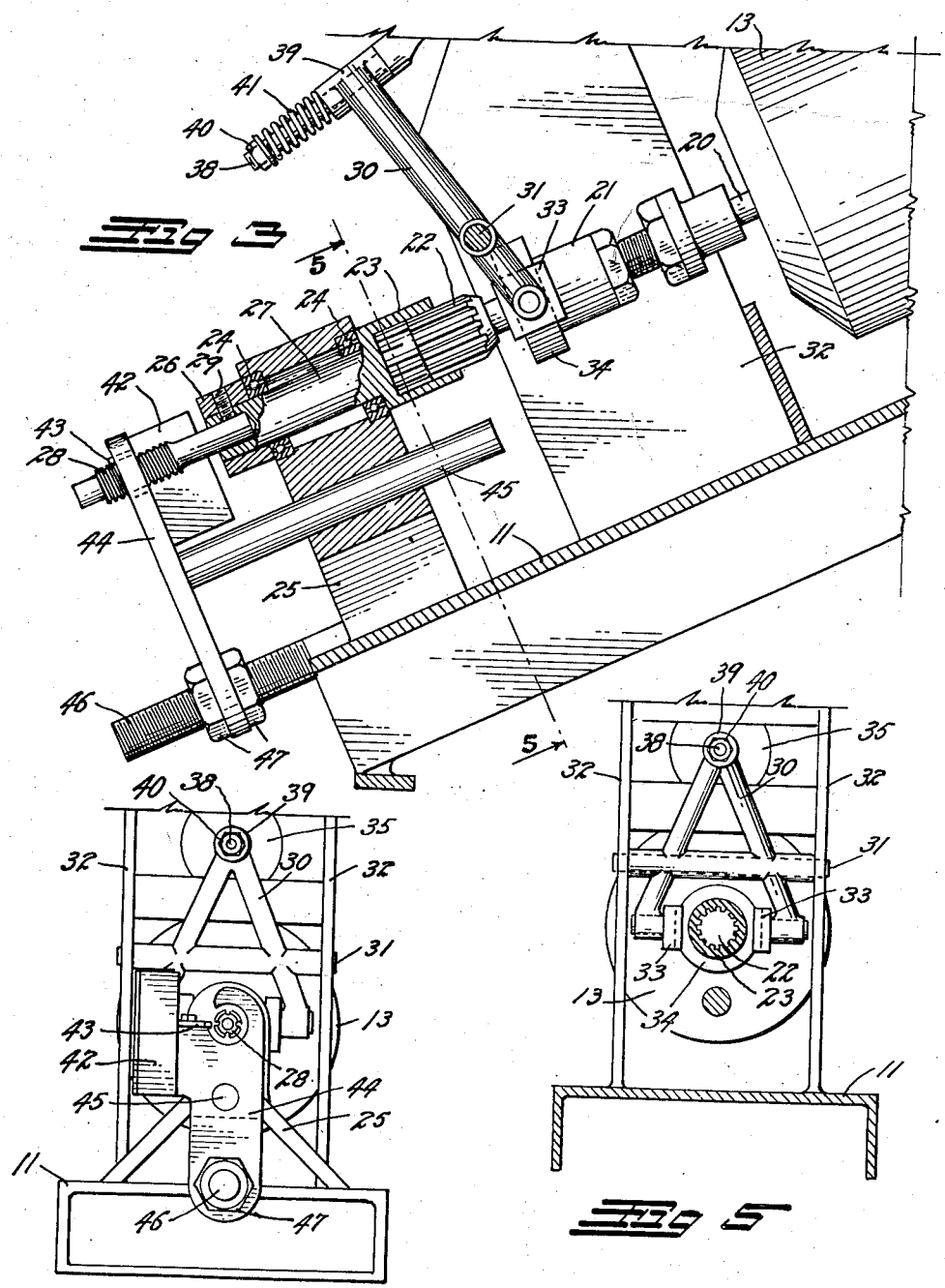
INVENTOR.
JOHN E. HECKETHORN
BY
ATTY.

Patented July 31, 1945

2,380,841

UNITED STATES PATENT OFFICE 2,380,841

THREADING AND TESTING MACHINE

John E. Heckethorn, Littleton, Colo.

Application April 17, 1944, Serial No. 531,515

7 Claims. (Cl. 10—136)

This invention relates to a threading device to be used either for tapping drill holes or for gauging and checking tapped holes. The principal object of the invention is to provide a simple, compact, rapid, unitary machine of the bench type, for tapping work held against the machine by hand; which can be preset to tap all holes to an accurate uniform depth; and which will automatically reverse at the completion of the tapping operation to rapidly unscrew the tap from the work.

Another object of the invention is to provide a machine of this character which can be used to gauge or test tapped holes in articles, to determine whether the thread therein is of the desired depth and length.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side view of the improved tapping and thread gauging machine;

Fig. 2 is a top view thereof looking in the direction of the arrow 2, Fig. 1;

Fig. 3 is an enlarged longitudinal section through the spindle of the improved machine, taken on the line 3—3, Fig. 2;

Fig. 4 is an end view of the tapping extremity of the machine; and

Fig. 5 is a cross section of the spindle, taken on the line 5—5, Fig. 3.

The improved machine is designed to be placed upon a work bench, such as indicated at 10, or any other suitable support which will place the operating extremity thereof at a convenient hand height.

The mechanism is mounted upon an inclined bed plate 11 designed to rest upon the bench 10 at its forward extremity and supported upon suitable legs 12 at its inner extremity. The legs 12 support the machine at an inclined angle on the bench to place the operating extremity at a convenient angle for the operator.

There are many tapping attachments available on the market designed to be placed in drill presses, lathes and the like. These tapping attachments are constructed to present a drive shank to be received in the chuck of a drill press or lathe and to present a spindle for receiving a chuck for holding the tap. These devices contain gears and friction clutches for driving the tap in a right-hand direction, as long as they are forced against the work, and in a left-hand direction when withdrawn from the work. The direction of rotation is controlled by shifting the spindle toward or away from the attachment.

This invention makes use of one of these standard tapping attachments known to the trade as "Procunier Style E," illustrated at 13 supported from the bed plate on suitable brackets 14. The drive shank of the tapping attachment is indicated at 15. This shank was, of course, originally designed to be held in the chuck or spindle of a drill press or lathe, but in this machine a driven sprocket 16 is mounted thereon. The sprocket 16 is driven through to the medium of a suitable transmission chain 17 from an electric motor 18 which is supported on a side bracket 19 from the bed plate 11. The spindle of the tapping attachment, indicated at 20, which in the usual installation carries the tapping chuck, is provided with a shifting sleeve 21 by means of which it may be shifted back and forth between the "reverse" and "forward" positions.

A splined hub 22 is mounted in and projects from the forward extremity of the shifting sleeve 21. The splined hub 22 is axially slidable in a hollow splined cup 23 which is formed, or secured on, an axially fixed shaft 27. The shaft 27 is journalled in bearings 24 supported from a pedestal 25 on the bed plate 11. The shaft 27 is prevented from moving endwise by the cup 23 and a suitable set collar 26. When the shifting sleeve 21 is pulled from the tapping device 13, the direction of rotation of the shaft 27 will be reversed. The shifting of the sleeve simply moves the splined hub 22 inwardly and outwardly in the cup 23 so that the hub and the cup are always tied to rotate in unison. The outer extremity of the shaft 27 is provided with a tool receiving socket in which any desired tool such as a thread gauge 28 or a tap may be secured by means of a suitable set screw 29 or in any other desired manner.

The shifting of the spindle 20, which in the usual tapping device is accomplished by pulling or pushing upon the tap, is accomplished in this device by means of an A-shaped shifting yoke 30. The yoke is pivotally mounted on a yoke shaft 31 supported in an upstanding frame member 32 carried by the bed plate 11. The lower extremities of the legs of the yoke terminate in shifting blocks 33 which are grooved on their inner faces for receiving the side edges of a thrust bearing 34 which is rotatably mounted on the shifting sleeve 21.

It can be readily seen that as the yoke 30 is rocked back and forth it will shift the spindle 20 of the tapping device 13 back and forth to change the direction of rotation thereof. The yoke is rocked forwardly by means of a spring which is part of the mechanism of the standard tapping attachment 13 and is rocked rearwardly by means of a solenoid 35 having a projecting armature member 36. The armature member is connected by means of connecting links 37, to a threaded rod 38 which passes through a receiving tube 39 on the upper extremity of the yoke member 30. A nut 40 is threaded on the rod 38 and serves to compress a spring 41 against the tube 39 so as to cushion the pulling action of the rod on the yoke and to make it unnecessary to have accurate adjustment of movement of the solenoid armature.

The solenoid 35 is controlled from a micro-switch 42 which is actuated from a feeler finger 43 extending into the path of the work. The micro-switch 42 and its actuating feeler finger 43 are supported from a gauge plate 44. The gauge plate 44 is mounted on a guiding slide rod 45 which passes through a guide hole in the pedestal 25. The tool, such as the thread gauge 28, passes freely through an opening in the upper extremity of the gauge plate 44. The lower extremity of the gauge plate surrounds a threaded gauge rod. The gauge plate may be locked in any desired position along the gauge rod 46 by means of suitable lock nuts 47.

The micro-switch 42 controls a remote control switch which is contained within a switch housing 48 mounted across the top of the frame member 32. The switch housing 48 is provided with the "start" and "stop" buttons 49 by means of which the solenoid 35 may be operated manually. A hand switch 50 is also provided by means of which the circuit to the solenoid control may be closed should it be desired to operate in reverse for a considerable period. The motor is controlled from a remote control switch mounted in a motor control box 51 also having "start" and "stop" buttons 52. An automatic timing switch is provided and enclosed in a housing 53, which holds the circuit to the solenoid closed for a preset interval after it has been closed by the feeler 43 and the micro-switch 42.

*Operation*

Let us assume that the machine is to be used for gauging the depth of threads in articles. The thread gauge 28 is placed in the shaft collar 26. The gauge plate 44 is adjusted by means of the nuts 47 so that when the article is threaded on to the gauge to the desired depth the feeler 43 will be contacted by the article to actuate the micro-switch. The motor 18 is started by the "start" button 52 on the motor box 51. The operator now presses the article onto the rotating gauge 28 which is rotating "right." If the thread is of the proper depth the article will be drawn upon the gauge until the feeler finger 43 is contacted. This will instantly close the micro-switch, and through it the circuit to the solenoid 35. The solenoid causes the armature 36 and the yoke 30 to pull the spindle 20 of the tapping machine 13 outwardly, thus reversing the direction of rotation of the spindle 20 and the gauge 28, to quickly unscrew the gauge from the article. The machine continues in operation in the reverse direction until the timing switch actuates the solenoid switch to deenergize the solenoid. The timing switch is so set as to allow the operator just sufficient time to remove the article from the gauge 28. It then breaks the circuit to the solenoid to allow the spindle to shift to the position for right hand rotation for receiving the next article. If the threads in the article are too short, the article will not reach the feeler arm 43 to actuate the solenoid and the articles will rotate in the operator's hand until the "start" button 49 of the control switch 48 is actuated by hand to energize the solenoid to reverse rotation and release the faulty article for discarding. When the machine is used for tapping, the same procedure is followed except that the gauge 28 is replaced by any desired tap. When the hole has been tapped to the desired depth the feeler finger 43 will be contacted to reverse and unscrew the tap. Thus all holes tapped with the same setting of the gauge plate will be of uniform tap depth.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. The combination with a tapping device of the type having a drive shank and a driven spindle in which axial shifting of the spindle reverses the direction of rotation thereof, of a bed plate; means for supporting said device on said bed plate; means for rotating said shank; a driven shaft; means for supporting said driven shaft from said bed plate in axial alignment with the spindle of said device; a slidable, splined connection between one extremity of said shaft and said spindle; means for axially supporting a tool at the other extremity of said shaft; a thrust bearing mounted on said spindle; a pivotally mounted yoke operatively connected with said thrust bearing; a solenoid; an armature actuated by said solenoid; means connecting said armature with said yoke for rocking the latter to shift said spindle longitudinally; a gauge member adjustably positioned adjacent said tool; and contact means supported by said gauge member in the path of the work on said tool for actuating said solenoid at a predetermined point.

2. The combination with a tapping device of the type having a drive shank and a driven spindle in which axial shifting of the spindle reverses the direction of rotation thereof, of a bed plate; means for supporting said device on said bed plate; means for rotating said shank; a driven shaft; means for supporting said driven shaft from said bed plate in axial alignment with the spindle of said device; a slidable, splined connection between one extremity of said shaft and said spindle; means for axially supporting a tool at the other extremity of said shaft; means for shifting said spindle longitudinally; a gauge member adjustably supported adjacent said tool; contact means carried by said gauge member to be contacted by the work on said tool; and means for actuating said shifting means in consequence of the contact of the work with said contact means.

3. The combination with a tapping device of the type having a drive shank and a driven spindle in which axial shifting of the spindle reverses the direction of rotation thereof, of a bed plate; means for supporting said device on said bed plate; means for rotating said shank; a driven shaft; means for supporting said driven shaft from said bed plate in axial alignment with the spindle of said device; a slidable, splined connection between one extremity of said shaft and said spindle; means for axially supporting a tool at the other extremity of said shaft; a thrust bearing mounted on said spindle; a pivotally mounted yoke operatively connected with said thrust bearing; a solenoid; an armature actuated by said solenoid; means connecting said armature with said yoke for rocking the latter to shift said spindle longitudinally; a gauge member adjustably positioned adjacent said tool; a pivoted feeler arm supported by said gauge member with one of its extremities in the path of the work on said tool; and an electrical contact closing device actuated by the other extremity of said feeler arm for actuating said solenoid.

4. The combination with a tapping device of the type having a drive shank and a driven spindle in which axial shifting of the spindle reverses the direction of rotation thereof, of a bed plate; means for supporting said device on said bed plate; means for rotating said shank; a driven shaft; means for supporting said driven shaft from said bed plate in axial alignment with the spindle of said device; a slidable, splined connection between one extremity of said shaft and said spindle; means for axially supporting a tool at the other extremity of said shaft; means for shifting said spindle longitudinally; a gauge member adjustably supported adjacent said tool; contact means carried by said gauge member to be contacted by the work on said tool; means for actuating said shifting means in consequence of the contact of the work with said contact means; and means for adjusting the position of said gauge member along said tool.

5. The combination of a tapping device of the type having a drive shank and a driven spindle in which axial shifting of the spindle reverses the direction of rotation thereof, of a bed plate; means for supporting said device on said bed plate; means for rotating said shank; a driven shaft; means for supporting said driven shaft from said bed plate in axial alignment with the spindle of said device; a splined hub on said spindle; a hollow splined cup on said driven shaft slidably receiving said hub; a bearing supporting said driven shaft from said bed plate, said bearing being arranged to prevent longitudinal movement of said shaft; tool supporting means on the free extremity of said shaft; and means for shifting said hub longitudinally in said cup to reverse said tapping device.

6. A device for gauging tapped holes comprising: a tapping attachment; a drive shank projecting from said tapping attachment; a motor operatively connected to said drive shank for rotating the latter; a spindle projecting from said tapping attachment; a reversing mechanism in said tapping attachment, said reversing mechanism being operable in consequence of longitudinal shifting of said spindle; a shaft supported in axial alignment with said spindle; means for preventing longitudinal movement of said shaft; means for transmitting rotative movement of said spindle to said shaft, at one extremity thereof; a tool receiving socket at the other extremity of said shaft; a thread gauge carried in said socket; electrical means for shifting said spindle axially to operate said reversing mechanism; a gauge plate surrounding said thread gauge; a feeler finger extending from said gauge plate towards said thread gauge; and a micro-switch operable from said feeler finger, said switch being in circuit with the electrical means for shifting the spindle.

7. A device for gauging tapped holes comprising: a tapping attachment; a drive shank projecting from said tapping attachment; a motor operatively connected to said drive shank for rotating the latter; a spindle projecting from said tapping attachment; a reversing mechanism in said tapping attachment, said reversing mechanism being operable in consequence of longitudinal shifting of said spindle; a shaft supported in axial alignment with said spindle; means for preventing longitudinal movement of said shaft; means for transmitting rotative movement of said spindle to said shaft, at one extremity thereof; a tool receiving socket at the other extremity of said shaft; a thread gauge carried in said socket; electrical means for shifting said spindle axially to operate said reversing mechanism; a gauge plate surrounding said thread gauge; a feeler finger extending from said gauge plate towards said thread gauge; a micro-switch operable from said feeler finger, said switch being in circuit with the electrical means for shifting the spindle; and means for adjusting the position of said gauge plate axially along said thread gauge.

JOHN E. HECKETHORN.